April 16, 1957 H. M. OLSON 2,789,022
PISTON RING
Filed June 15, 1955 2 Sheets-Sheet 1
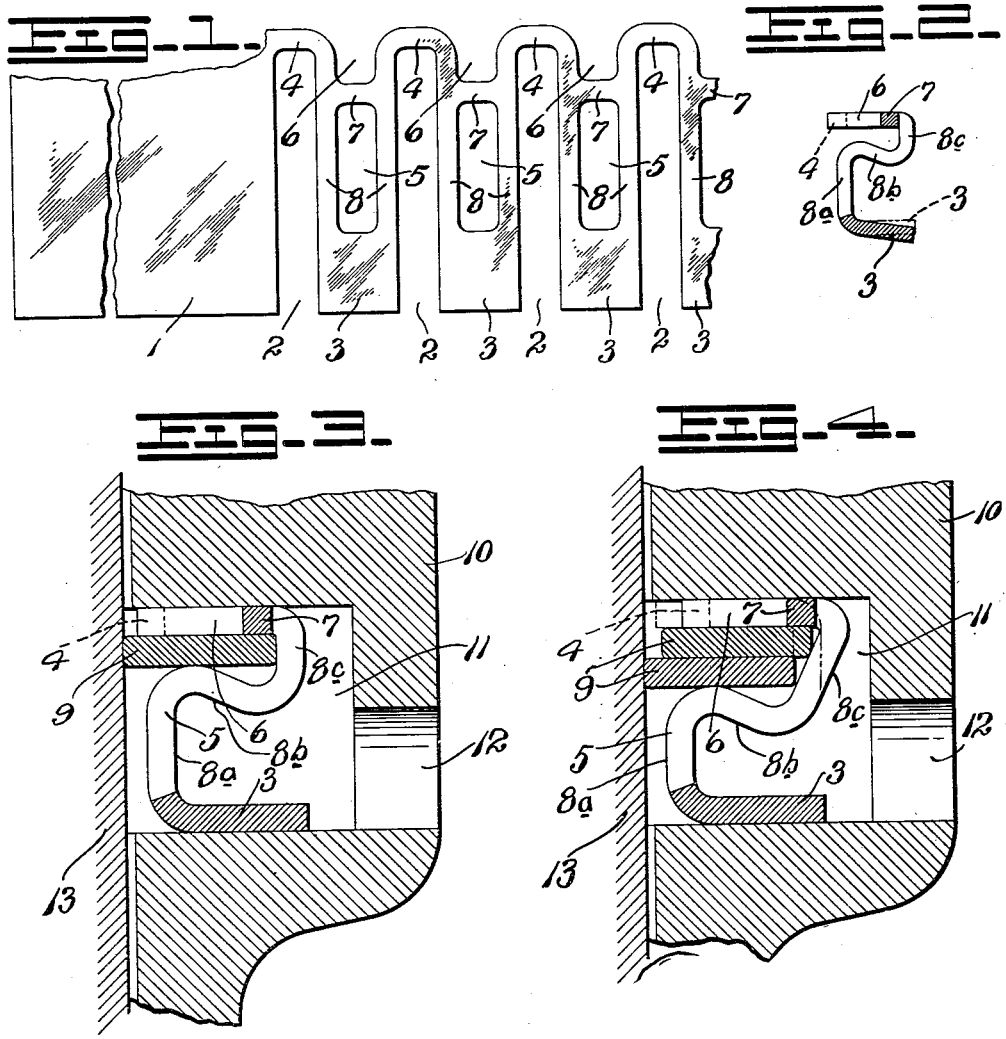
INVENTOR
Holly M. Olson
BY
Frank E. Liverance, Jr.
ATTORNEY April 16, 1957 H. M. OLSON 2,789,022
PISTON RING
Filed June 15, 1955 2 Sheets-Sheet 2
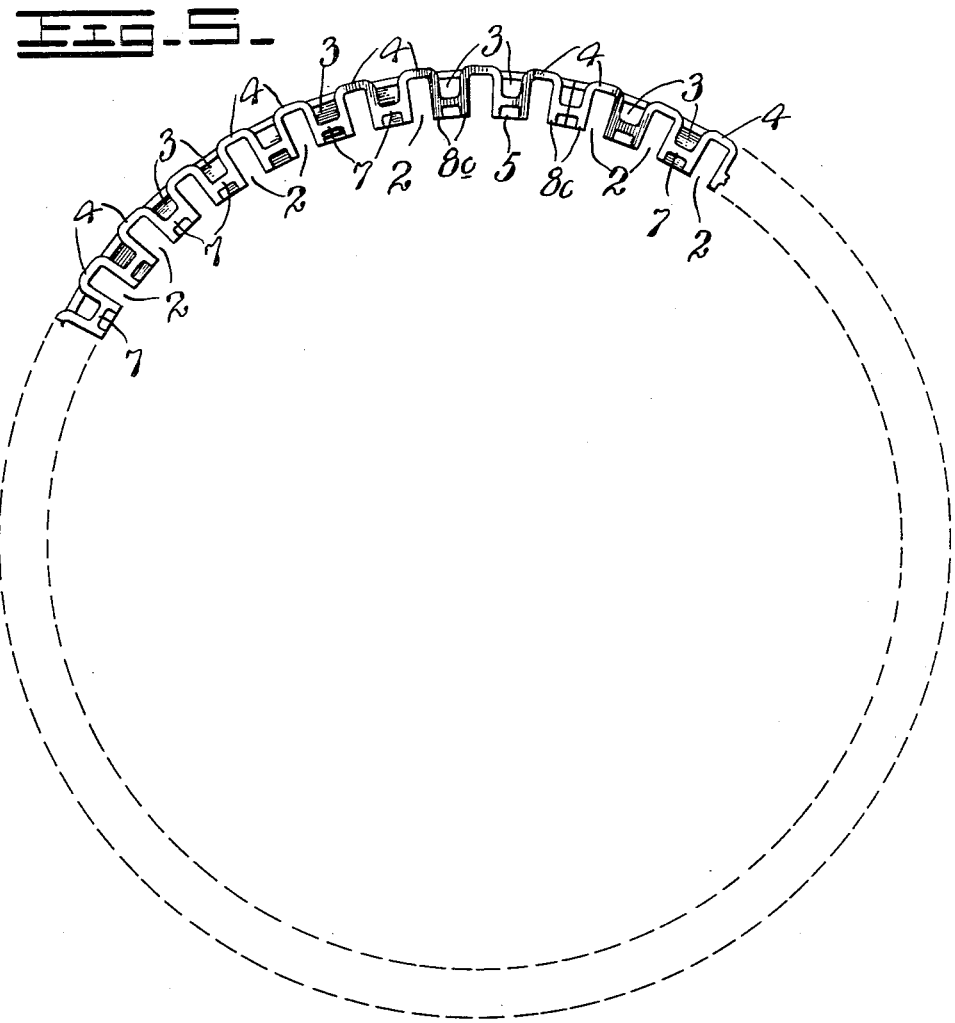
INVENTOR.
Holly M. Olson
BY
Frank E. Liverance Jr.
Attorney

United States Patent Office 2,789,022
Patented Apr. 16, 1957

2,789,022
PISTON RING

Holly M. Olson, Muskegon, Mich., assignor to Sealed Power Corporation, Muskegon, Mich., a corporation of Michigan Application June 15, 1955, Serial No. 515,643

7 Claims. (Cl. 309—44)

This invention is directed to a simple, novel, practical and readily and easily manufactured and handled piston ring of the oil salvaging type, adapted to be located in the lower groove of a piston in an internal combustion engine, to scrape and remove excess lubricating oil from the walls of a cylinder and direct it inwardly to the bottom of the ring groove in which my novel piston ring is installed and, therefrom, to the interior of the piston and back to the crankcase.

Present day internal combustion engines used particularly in motor vehicles, have high compression and high vacuum requiring piston rings of high tension and with hard wearing surfaces which move over the interior surfaces of engine cylinders; and further, such piston rings must be of a flexibly pliable nature to follow and conform to cylinder wall irregularities. A piston ring for operating under such conditions has generally, two spaced apart thin rails, one to be against the upper and the other against the lower side of a piston ring groove with a spacer between them to hold them in proper relation to the groove sides; and back of the spacer a spring expander of ribbon material with alternate inwardly and outwardly extending humps or corrugations is placed, the inner corrugations bottoming against the bottom of the piston ring groove. Such piston rings in general performed reasonably satisfactorily, prior to the adoption of the shorter cylinders and pistons and higher compression and vacuum requirements. From a practical standpoint, however, they have not been generally used except for replacement as their installation in the oil ring grooves is expensive because of the time required to place the four parts, one after another in a ring groove. Labor costs have, therefore, generally prevented the use of such oil salvaging rings in new or original engine production.

With my invention a piston ring securing all of the advantages and more than those previously used is provided, eliminating the lower rail which in a large measure is of minor utility, eliminating the separate corrugated expander which had to bear against the bottom of a piston ring groove, and so joining either a single rail or two rails with a combined spacer and expander of a circumferentially compressible type that the ring was maintained with the parts held together as a unit during any handling thereof such as stocking, handling, assembling and particularly in installation in ring grooves of pistons. Also with my invention, either one or two rails used at the upper part of the ring groove were gripped and sufficiently held that they would not fall apart or otherwise become disassambled in stocking, handling and installing in the ring groove. The outer edges of the rail or rails plated with chromium provided a hard wearing surface of long life in use.

The piston ring of my invention also in addition to its desirable advantages in handling, assembling, installing and the like, may have the depth of the ring groove in the piston disregarded as no expander is bottomed upon the ring groove bottom and variations in the ring groove depth are of no consequence. Such piston ring also provides wide venting passages through the ring for the return of oil scraped from cylinder walls to the interior of the piston and thence to the crankcase. With my invention also the circumferentially compressible nature of the ring provides forces for pressing the rail or rails used at their outer edges with desired unit pressure against a cylinder wall, and the combined circumferentially compressible rail holder and expander when installed in a piston ring groove has forces generated therein which forces it at its opposite sides against the upper and lower sides of the ring groove to seal against the passage of oil at the upper side of the ring groove. My invention is also, because of its simplicity of structure, economical to produce and when assembled, as a unit may be handled for installation in a piston by automatic loading devices greatly reducing the cost of piston and piston ring assembly.

An understanding of the invention and of preferred structure embodying the same may be had from the following description, taken in connection with the accompanying drawing, in which, Fig. 1 is a plan view showing the flat elongated or ribbon stock and the first steps of the processing thereof to provide the rail carrier and expander of my invention.

Fig. 2 is a transverse section through such rail carrier and expander after it has been shaped and formed for such purpose.

Fig. 3 is an enlarged vertical section through the lower ring groove in a piston and through a piston ring of my invention installed therein using one rail segment.

Fig. 4 is a vertical section like that in Fig. 3 two of the rail segments being used in the piston ring, and Fig. 5 is a fragmentary plan view of the rail holder and expander of my invention, the circular outline thereof being continued in dashed lines.

Like reference characters refer to like parts in the different figures of the drawing.

In the construction of the piston ring of my invention, the circumferentially compressible rail segment holder and expander is made from a length of thin, spring metallic material, as indicated at 1, which fed through a punch press or the like has cut therein from one edge spaced slots 2 leaving between the slots sections 3. The slots 2 extend from one edge toward but short of the opposite edge of the ribbon stock 1 so that each each slot 2 is open at one end and closed at the other end by a narrow tie 4 which is integral with the sections 3. Each of the sections 3 is left full width for a distance at the open ends of the slots 2 but has punched therefrom rectangular openings 5 in the bodies of sections 3 and short slots 6 in the opposite ends of the sections between the slots 2, a cross tie 7 being left between the inner closed ends of the slots 6 and the adjacent ends of the rectangular openings 5. Such rectangular openings 5 when cut have at each side thereof narrowed portions 8 as shown in Fig. 1. The desired length of the material as thus processed and prepared is shaped and formed by bending the portions 8 in short vertical sections 8a from the end portions 3 thence being bent and curved inwardly to make solid generally horizontal sections 8b over the bottom sections 3, preferably at an inclination to the horizontal as shown in Fig. 3 downwardly and inwardly, thence upward in a short vertical section 8c reaching substantially to the cross ties 7 and terminating in outwardly extending horizontal portions which include the ties 4 and legs extending therefrom, such ties 4 and 7 and the legs extending therefrom, one at each side of each slot 6, being in a common horizontal plane over the section 8b.

Such piston ring is shaped into piston ring form, that is, to circular form, having its ends abutting each other as is usual in piston rings and providing a parting so that the ring may be passed over the upper end of a piston to reach the ring groove in which it is to be placed. In its normal form with the ends abutting, the circumferential length is greater than that of the ring groove in which it is to be placed, whereby when a rail segment or more than one of them is installed within a cylinder the rail carrying member thus described is circumferentially shortened and compressed. A circular, parted rail segment 9 of thin metal stock of well known and conventional form is inserted in the space over the sections 8b and below the ties 4 and 7 being held with sufficient gripping force that it will not readily disconnect. When thus assembled the inner edges of the rail 9 come against the vertical sections 8c and the outer edges extend beyond the outer edges of the ties 4.

Such assembled and complete piston ring may be installed in the ring groove of an internal combustion engine piston. In Fig. 3 a fragmentary lower portion of the head of the piston is shown at 10, with the ring groove 11 receiving the piston ring. Such ring groove has drainage passages 12 from the bottom thereof to the interior of a piston. When installed in a cylinder, the wall of which is fragmentarily indicated at 13, the expander and rail carrier is circumferentially compressed and the outer hard plated edges of the rail 9 forced against the cylinder wall with a desired and designed pressure. The upper sides of the ties 4 and 7 and the connecting legs between them are pressed against the upper side of the ring groove 11 by straining the lower sides 3 from the downward and inward incline in which they are formed, as in Fig. 2, to the horizontal position indicated in such figure in dashed lines, so that an axial pressure of the rail holder and expander against the upper side of the ring groove is provided. There is a continuous seal between the upper sides of the ties 4 and 7 and the legs at the opposite sides of the slots 6 which upper sides are pressed snugly with sealing pressure against the upper side of the piston ring groove.

In Fig. 4 a slight modification in structure is provided showing two rails 9, one over the other occupying the place of the single rail 9 in Fig. 3 and with the space between the sections 8b and the ties 4 and 7 sufficiently widened to take the two rails. Further, the sections 8c are inclined upwardly and inwardly. With such structure the lower rail 9 at its outer edges comes against the cylinder wall 13 and bears against such wall alone until it has been sufficiently worn that the outer edges of the upper rail reach the cylinder wall. This provides for quick and easy seating of the rails and because of the two rails being against the cylinder wall the wear on each rail after both are seated in less adding to the effective life of the piston ring. It is to be understood that the dimensions of the parts are shown increased and that the inclination of the sections 8c in Fig. 4 exaggerated, the outer edges of the upper rail 9 coming to the cylinder wall after a comparatively slight wear of the outer edges of the lower rail 9.

From the foregoing description it is apparent that the rail or rails 9 are held in place when assembled with their carrier and expander, may be handled as a unit in stocking, shipping and installation as in the lower groove of a piston ring, and that, as units, such installation is quick and easy and as inexpensive as with any single piece piston ring. Ample ventilation for the passage of oil is provided. In the form shown in Fig. 3 a complete piston ring consists of but two parts both of which may be economically produced.

The invention is defined in the appended claims and is to be considered comprehensive of all forms of structure coming within their scope.

I claim:

1. A piston ring comprising, a circular, parted, circumferentially compressible ring element, a circular, parted, flat rail segment, and means for frictionally connecting said rail segment to said ring element at the upper portion of said element, said rail segment being located in a plane generally parallel to the planes of the upper and lower sides of said element and extending at its outer edges beyond the outer sides of said ring element.

2. A piston ring comprising, a circular, parted, circumferentially compressible ring element, a circular, parted flat rail segment, and means around the upper portion of said ring element having spaced upper and lower portions separated and open at the outer side and closed at the inner side of said ring element between which said rail segment is received and frictionally gripped.

3. A piston ring comprising, a circular, parted, circumferentially compressible ring element, a circular, parted rail segment, means around the upper portion of said ring element having spaced upper and lower portions separated from the outer side of said element to the inner side thereof, and means at the inner side of said ring element connecting said upper and lower portions thereof, said rail segment being located between said ring element upper and lower portions and at its inner edges against said connecting means, said rail segment being gripped by yielding pressure engagement thereagainst at its upper and lower sides by said lower and upper portions of said ring element.

4. A piston ring comprising, a circular, parted, circumferentially compressible rail expander and carrier having a succession of spaced generally U-shaped segments, each comprising a lower flat flange portion, a web extending upwardly from the outer edge of said flange portion, an upper flange portion extending inwardly from the upper end of said flange, said upper flange portion at its inner edge continuing upwardly for a short distance and thence terminating in an outwardly extending portion, and ties connecting successive outwardly extending portions at the outer ends thereof, and a circular, parted, flat rail segment located between said upper flange portions of said U-shaped segments and said terminal outwardly extending portions, frictionally engaging thereagainst at the lower and upper sides of said rail segment, to normally grip and hold said rail segment against separation.

5. Structure having the elements defined in claim 4, said web of each segment having a vent opening therethrough, and said outwardly extending portion of each segment having an inwardly extending slot between its side edges, open at its outer end and closed at its inner end.

6. A piston ring comprising, a circular parted, resistingly yielding, circumferentially compressible rail expander and carrier having rail receiving means disposed around it and at its upper portion opening outwardly for the insertion of a thin, flat, parted circular rail therein, said means, at its upper side lying in an unbroken plane, and adapted, at said upper side to seat against the upper side of a piston ring groove and provide a continuous seal against oil passage, a thin, parted, circular rail located in said rail receiving means and gripped thereby, and means at the inner end of said rail receiving means against which the inner edges of said rail engage.

7. Structure having the elements defined in claim 6, and a second thin, parted circular rail located over the first rail, said rail receiving means grippingly pressing against the outer sides of said rails, and the upper rail, at its outer edges being located inwardly from the outer edges of the under rail.

References Cited in the file of this patent

UNITED STATES PATENTS 2,317,580    Bauer    Apr. 27, 1943
2,587,888    Phillips    Mar. 4, 1952